US006691200B1

(12) United States Patent
Zhou et al.

(10) Patent No.: US 6,691,200 B1
(45) Date of Patent: Feb. 10, 2004

(54) MULTI-PORT PCI-TO-PCI BRIDGE WITH COMBINED ADDRESS FIFOS BUT SEPARATE DATA FIFOS FOR CONCURRENT TRANSACTIONS

(75) Inventors: Zhinan Zhou, San Jose, CA (US); Kimchung Arthur Wong, Fremont, CA (US)

(73) Assignee: Pericom Semiconductor Corp., San Jose, CA (US)

(*) Notice: Subject to any disclaimer, the term of this patent is extended or adjusted under 35 U.S.C. 154(b) by 491 days.

(21) Appl. No.: 09/681,569

(22) Filed: May 1, 2001

(51) Int. Cl.[7] .............................................. G06F 13/36

(52) U.S. Cl. ........................ 710/314; 710/310; 710/312

(58) Field of Search ............................ 710/8, 309, 310, 710/313, 314, 316, 57, 312; 713/400

(56) References Cited

U.S. PATENT DOCUMENTS

| | | | | |
|---|---|---|---|---|
| 5,392,407 A | | 2/1995 | Heil et al. | |
| 5,522,050 A | | 5/1996 | Amini et al. | |
| 5,535,340 A | | 7/1996 | Bell et al. | |
| 5,548,730 A | | 8/1996 | Young et al. | |
| 5,632,021 A | | 5/1997 | Jennings et al. | |
| 5,664,122 A | | 9/1997 | Rabe et al. | |
| 5,712,986 A | | 1/1998 | Vo | |
| 5,768,548 A | | 6/1998 | Young et al. | |
| 5,802,333 A | * | 9/1998 | Melvin | 710/316 |
| 5,815,677 A | | 9/1998 | Goodrum | |
| 5,878,237 A | | 3/1999 | Olarig | |
| 5,881,254 A | | 3/1999 | Corrigan et al. | |
| 5,941,970 A | | 8/1999 | Lange | |
| 5,983,306 A | | 11/1999 | Corrigan et al. | |
| 6,092,141 A | | 7/2000 | Lange | |
| 6,272,582 B1 | * | 8/2001 | Streitenberger et al. | 710/314 |

OTHER PUBLICATIONS

PCI Special Interest Group, "PCI–to–PCI Bridge Architecture Specification", Rev. 1.1, Dec. 18, 1998, pp. 1–148.

* cited by examiner

*Primary Examiner*—Khanh Dang
(74) *Attorney, Agent, or Firm*—Stuart T. Auvinen

(57) ABSTRACT

A multi-port Peripheral Component Interconnect (PCI) bus bridge allows for cascading of PCI buses and reduction of bus loading and traffic. The multi-port PCI bridge has three or more ports that connect to PCI buses. At each destination port, a pair of data FIFOs is provided for each source port, for read and write data. Each destination port has three address FIFOs, one for posted-memory-write (PMW) addresses, another for delayed-transaction-request (DTR) addresses and data, and a third for delayed-transaction-completion (DTC) addresses. An address mux receives addresses from all source ports and combines them into the three address FIFOs. When addresses arrive concurrently, the address mux delays one address until the first address has been written into the address FIFO, and then writes the delayed address. Since separate data FIFOs are used for each source port, data is not delayed. Concurrent transactions from different source ports to the same destination port can occur.

20 Claims, 13 Drawing Sheets

| | | PORT P1 | | | | |
|---|---|---|---|---|---|---|
| | | | DTR | | DTC | |
| | | PMW | DRR | DWR | DRC | DWC |
| PORT P0 | PMW | DLY P1 | DLY P1 | DLY P1 | DLY P1 | NO DLY |
| | DRR | DLY P0 | DLY P1 | DLY P1 | NO DLY | NO DLY |
| | DWR | DLY P0 | DLY P1 | DLY P1 | NO DLY | NO DLY |
| | DRC | DLY P0 | NO DLY | NO DLY | DLY P1 | DLY P1 |
| | DWC | NO DLY | NO DLY | NO DLY | DLY P1 | DLY P1 |

FIG. 4

CONCURRENT PMW, PMW

CONCURRENT PMW, DTR

CONCURRENT PMW, DTC

CONCURRENT PMW, DTC

CONCURRENT DTR, DTC

MULTI-PORT PCI-TO-PCI BRIDGE WITH COMBINED ADDRESS FIFOS BUT SEPARATE DATA FIFOS FOR CONCURRENT TRANSACTIONS

BACKGROUND OF INVENTION

This invention relates to peripheral bus bridges, and more particularly to concurrent transactions on a multi-port PCI bridge.

The rapid and widespread acceptance of the personal computer (PC) is in part due to the ability to expand its functionality. Expansion cards could be inserted into AT-bus connectors in early PC's, allowing a modem, network adapter, expansion memory, or audio card to be added to the PC. While many PC's continue to use the AT expansion bus, many also include the higher-performance Peripheral Component Interconnect (PCI) bus. Higher-performance PCI cards can be inserted into PCI connectors or slots on such PC's.

Various chip sets have been developed to interface the PC's local processor bus to one or more PCI buses. The PCI bus can be divided or segmented into two or more PCI buses, thus reducing the bus loading and improving performance. Various PCI-to-PCI bus bridges have been developed. While many 2-port bridges are available, a multi-port bridge allows 3 or more PCI busses to be used, further dividing the bus load and potentially improving performance. Compare Olarig, U.S. Pat. No. 5,878,237 to Lange, U.S. Pat. No. 5,941,970.

While PCI bridges are useful, it is desirable for the bridge to be able to handle concurrent transactions from different buses. While some concurrency is permitted, transaction concurrency may be limited to memory transactions for different addresses, such as for different lines in a cache.

What is desired is a multi-port PCI-to-PCI bridge. A PCI bridge that can connect to more than two PCI buses is desirable. A multi-port PCI bridge that processes concurrent transactions is desired. Concurrent transaction processing without memory address limitations is further desired.

DESCRIPTION OF DRAWINGS

FIG. 4 is a table of transaction ordering when simultaneous addresses from different ports are received.

DETAILED DESCRIPTION

The present invention relates to an improvement in bus bridges. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
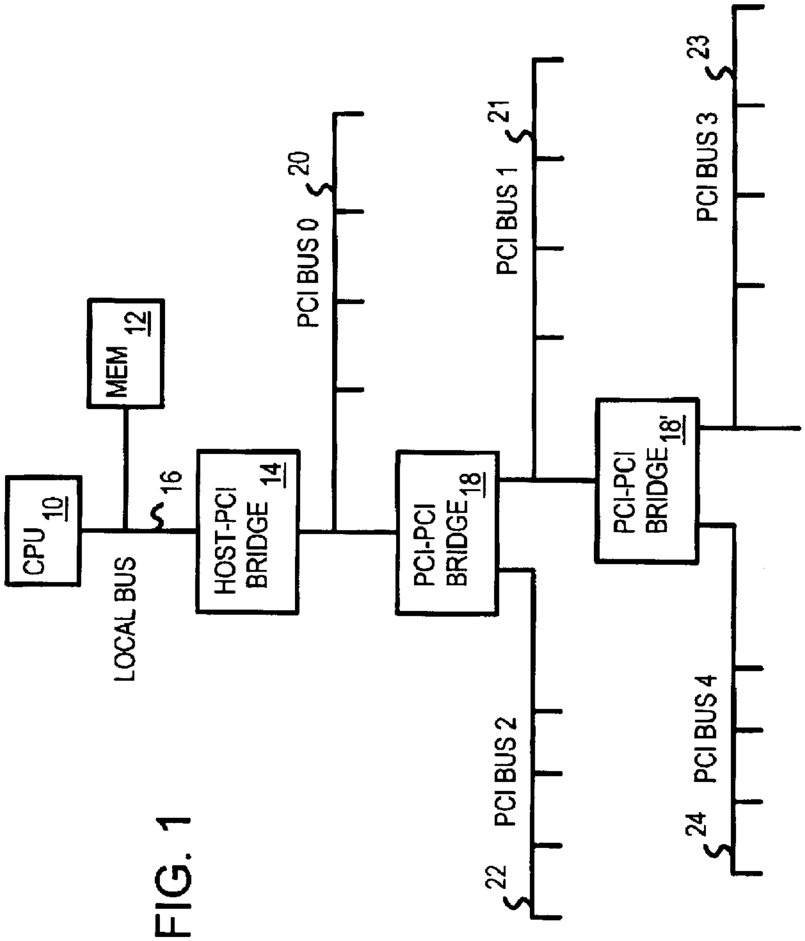
FIG. 1 is a block diagram of a computer with cascaded PCI buses.

FIG. 1 is a block diagram of a computer with cascaded PCI buses. Processor 10 is a central processing unit (CPU) that executes program instructions. These instructions can be stored in local memory 12 and accessed over local bus 16. The program instructions are typically stored in a peripheral device such as a hard disk and copied to local memory 12 before execution, perhaps using a paging process. Peripheral such as hard disk drive controllers can be attached to one of the Peripheral Component Interconnect (PCI) buses 20–24. A wide variety of other peripheral devices can be attached to PCI buses 20–24 such as PCI expansion cards plugged into connector slots or controller chips mounted directly on a motherboard.

PCI-host bridge 14 connects first PCI bus 20 to local bus 16. PCI-host bridge 14 may be part of a larger chip set that controls local memory 12. PCI bus 20 may contain several slots that can accept PCI expansion cards, or it may have board-mounted controller chips that do not need separate expansion cards.

PCI bus 20 also connects to PCI bridge 18. PCI bridge 18 is a multi-port bridge that connects three PCI buses 20, 21, 22. Transactions on one bus are passed through PCI bridge 18 to one of the other buses.

PCI bus 21 is also connected to PCI bridge 18'. PCI bridge 18' forwards transactions among three PCI buses 21, 23, 24. Various slots may be provided on PCI buses 20–24, providing more expansion slots than possible if just one undivided PCI bus was used. PCI bridges 18,18' allow cascading of four additional PCI buses 21–24, expanding the expansion capabilities of the computer.

Bus loading is reduced since each PCI bus has only a few expansion slots on it. Bus traffic can be reduced since transactions destined for one PCI bus do not have to be sent to all PCI buses. For example, a transaction from the PCI bus 23 to PCI bus 24 does not create bus transactions on PCI buses 20, 21. Thus bus traffic can be reduced by using multi-port bridges. Additional PCI bridges could be added to cascaded more PCI buses together, further reducing bus loading and traffic.

Figure 2:
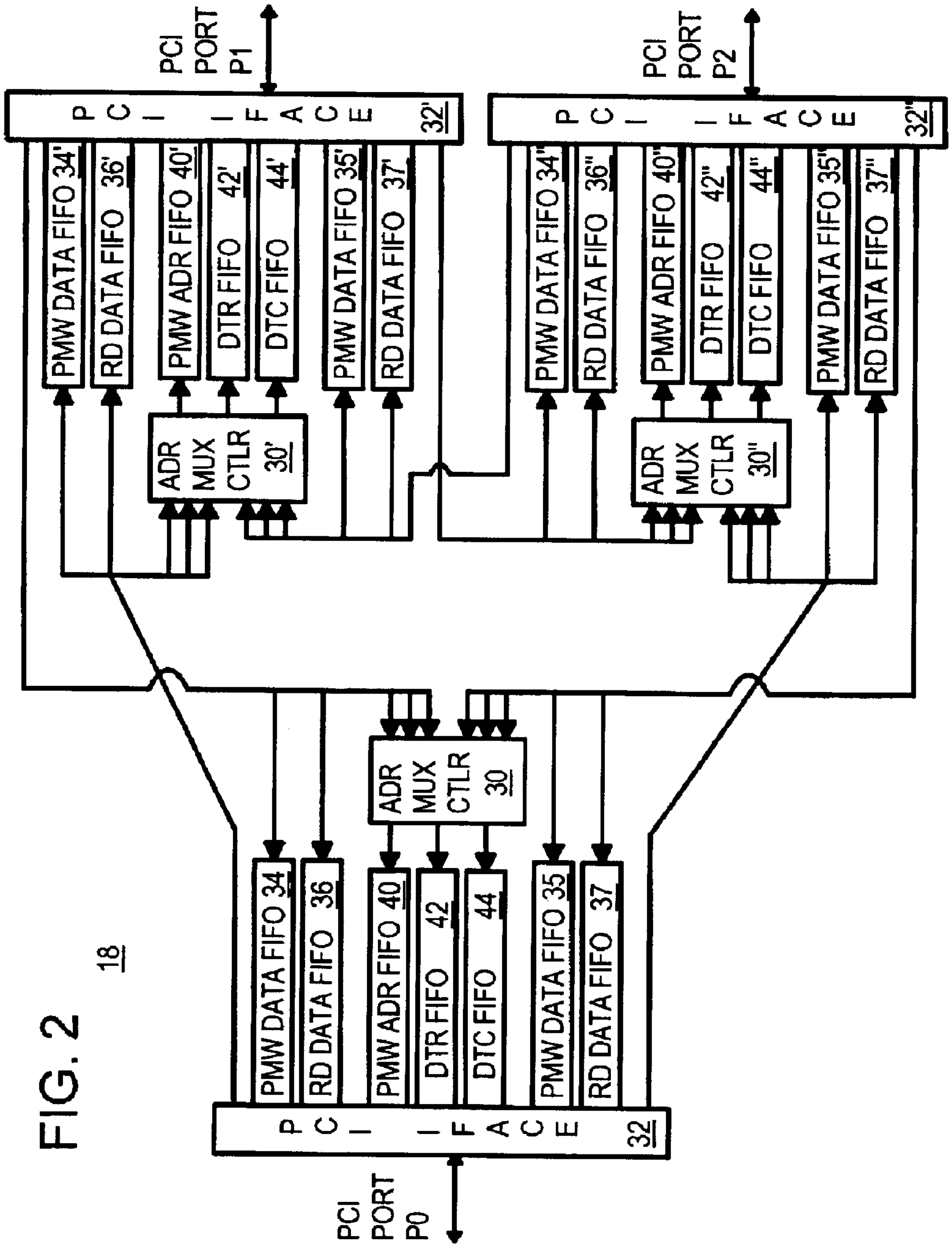
FIG. 2 is a diagram of a 3-port PCI bridge.

FIG. 2 is a diagram of a 3-port PCI bridge. PCI bridge 18 connects to three PCI buses through ports P0, P1, and P2. PCI interfaces 32, 32', 32" generate PCI-bus control signals using state machines or other logic devices, and drive and receive address and data signals over a 32- or 64-bit combined address and data bus. Each of PCI interfaces 32, 32', 32" operates independently of the other interfaces.

During a bus transaction through bridge 18, address and data information are received at one of the bridge's ports by one of PCI interfaces 32, 32', 32". This port that receives the address and data is known as the source or originating port. The address and data are then sent through internal buses on the bridge to be stored in first-in-first-out (FIFO) buffers at the output or destination port. The transaction may then be re-ordered or delayed until its address and data are transmitted out from the FIFOs through the PCI interface to the external destination PCI bus.

For example, a bus transaction from port P0 to port P1 first receives address from the PCI bus attached to port P0 through PCI interface 32. The address information is forwarded through address mux 30' to the address FIFO for destination port P1, such as address FIFO 40'. The data received from the PCI bus on port P0 is also forwarded from PCI interface 32 to data FIFO 34' on port P1. The transaction is then stored in FIFOs 40' 34' until the PCI bus on port P1 is available and any other higher-priority transactions to port P1 have completed. The address from FIFO 40' and the data from FIFO 34' are then transmitted by PCI interface 32' to the PCI bus on port P1, completing the bus transaction through bridge 18'.

Three Transaction Types, Three Address FIFOs

There are three basic types of PCI bus transactions. During a posted-memory-write (PMW) transaction an originating PCI bus sends an address followed by one or more data words to be written to a destination PCI bus. Posted writing to another bus can be completed in a single bus transaction.

However when reading from or delayed writing to another PCI bus, two PCI bus transactions are needed. The first transaction is known as a delayed-transaction request (DTR), while the second transaction is called a delayed-transaction completion (DTC). For the DTR (first) transaction, the requesting port is the port connecting to the originating bus, while the target port is the port connecting to the destination bus. For the DTC (second) transaction, the target port is the port connecting to the originating bus, while the requesting port is the port connecting to the destination bus. Furthermore, DTR transactions are categorized as delayed read requests (DRR) and delayed write requests (DWR), while DTC transactions are delayed read completions (DRC) and delayed write completions (DWC).

Both delayed read and write cycles can occur using the paired DTR, DTC transactions. When the delayed transactions are for reading data from a destination bus to an originating bus, the transactions are known as a delayed-read-request (DRR) and delayed-read-completion (DRC). When the delayed transactions are for writing data to a destination bus from an originating bus, the transactions are known as a delayed-write-request (DWR) and delayed-write-completion (DWC).

Each destination port has three address FIFOs, one for each primary type of bus transaction. For port P0, posted-memory-write (PMW) address FIFO 40 stores addresses for posted-memory write cycles that originate from either port P1 or port P2. Delayed-transaction-request (DTR) address FIFO 42 stores addresses for delayed read transaction requests, or both addresses and data for delayed write transaction requests from either port P1 or P2. Delayed-transaction-completion (DTC) address FIFO 44 stores addresses for delayed read or write transaction completions from either port P1 or P2.

Address mux 30 multiplexes addresses from ports P1 and P2 into address FIFOs 40, 42, 44. Address mux 30 also contains latches or registers and control logic to delay writing an address to an address FIFO when two ports attempt to write to the same address FIFO at the same time. Similar address mux 30' multiplexes addresses from ports P0 and P2 to port P1's address FIFOs 40', 42', 44', while address mux 30" multiplexes addresses from ports P0 and P1 to port P2's address FIFOs 40", 42", 44".

Separate Data for Each Originating Port

While transactions from different requesting ports are stored in the same address FIFOs, separate data FIFOs are used for each requesting port. Using separate data FIFOs allows data to be received synchronized to the data-phase on the requesting port without contention delays.

Each target port has a separate pair of data FIFOs. One data FIFO is for posted memory writes, and the other data FIFO is for delayed-completion reads and writes. For example, when port P0 is the target port, posted-memory-write data from port P1 is stored in PMW data FIFO 34, while delayed-completion data from port P1 is stored in DTC data FIFO 36. Posted-memory-write data from port P2 is stored in a separate PMW data FIFO 35, while delayed-completion data from port P2 is stored in DTC data FIFO 37.

Each target port has separate pairs of data FIFOs for each requesting port. Thus target port P2 has PMW FIFO 34" for writes from requesting port P1, but PMW FIFO 35" for writes from requesting port P0. Target port P2 also has DTC data FIFO 36" for delayed-completion data from port P1, and DTC data FIFO 37" for delayed-completion data from requesting port P0.

Although a combined line for both address and data from one port to another port is shown in the FIG. 2, the actual internal bus structure inside bridge 18 can have separate internal buses for address and data. This allows for address and data to be simultaneously sent to separate data FIFOs and addresses FIFOs. Also, separate data buses can be used for read and write data, and separate address buses can be used for each type of transaction—PMW, DTR, DTC.

Separate data FIFOs are used for each requesting or originating port, allowing data to be received without contention delays. However, combined address FIFOs receive address information from all originating ports. Contention for an address FIFO may occur for an address FIFO when two originating ports send addresses to the same destination port. Since multiple cycles are often needed to transfer (burst) many words of data, the single address word can be delayed somewhat and still be processed before the multiple data words in a data burst have been stored in the data FIFO.

Figure 3:
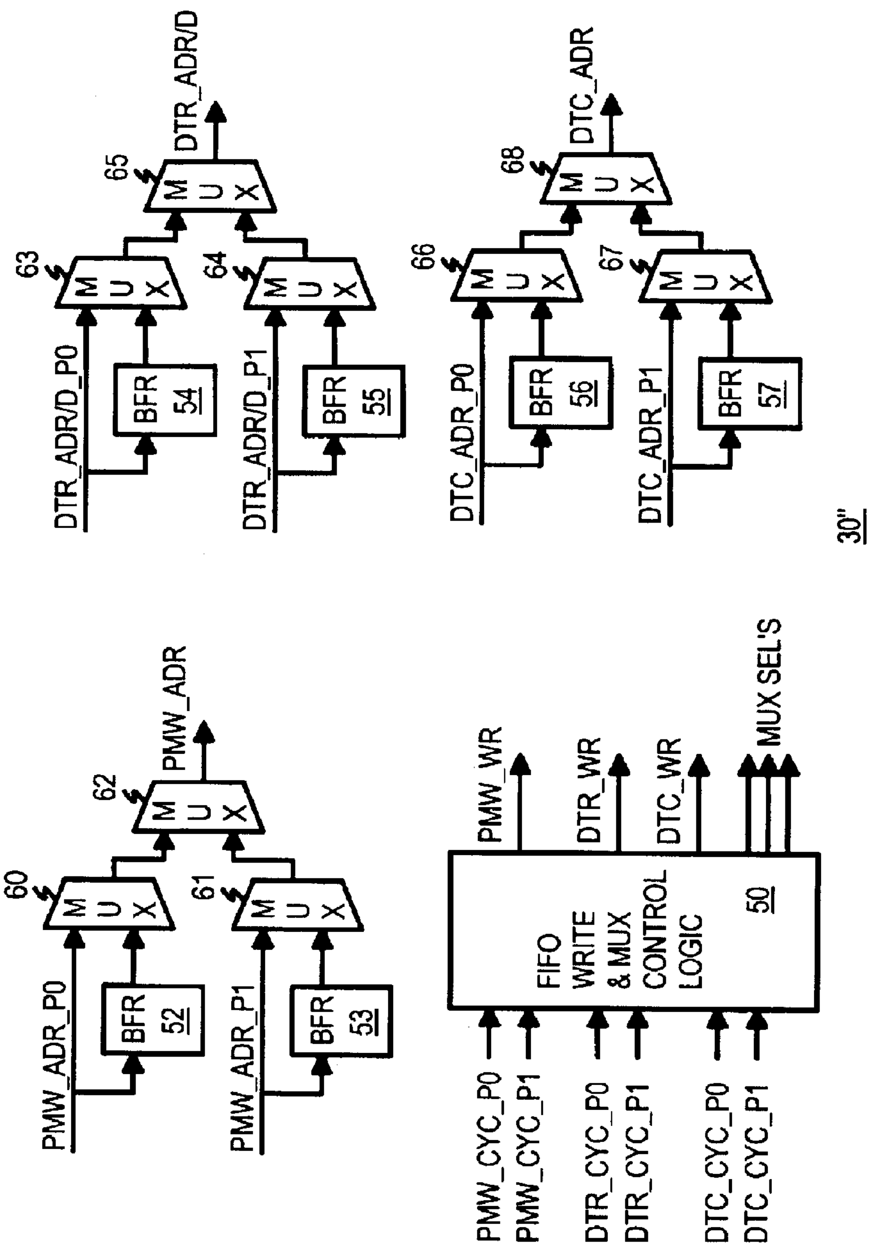
FIG. 3 is a diagram of an address mux and controller for merging addresses from separate ports into address FIFOs.

FIG. 3 is a diagram of an address mux and controller for merging addresses from separate ports into address FIFOs. Address mux 30" of FIG. 2 is shown, which combines addresses from ports P0 and P1 for destination port P2. Other address muxes are similar.

The posted-memory write PMW addresses from ports P0, P1 are latched by buffer registers 52, 53 respectively. Muxes 60, 61 select either the latched (delayed) address or the bypassed (direct) addresses. Mux 62 selects either an address from port P0 or an address from port P1 for writing to the PMW address FIFO at port P2. When two ports simultaneously send a PMW address to port P2, one of the addresses is latched in one of registers 52, 53, while the other PMW address is bypassed and written to the PMW address FIFO. On the next cycle, the latched PMW address is written to the PMW FIFO. Thus one of the addresses can be latched and delayed for writing into the address FIFO on the next cycle. This latching and bypassing allows two addresses to be accepted at the same time without inserting any wait cycles on either originating bus.

For example, when both ports P0, P1 send a PMW address to port P2, the P0 address is bypassed and output through muxes 60, 62 and written to the PMW address FIFO. The P1 address (PMW_ADR_P1) is latched in buffer register 53. On the next FIFO write cycle, the P1 address stored in register 53 is output through muxes 61, 62 and written to the next location in the PMW address FIFO.

For DTR request transactions, a DTR address can be received from both ports P0 and P1. Registers 54, 55 store the P0 and P1 DTR addresses, while muxes 63, 64 allow a DTR address to be bypassed and immediately written to the DTR address FIFO. Mux 65 selects either the P0 or P1 address for writing into the DTR address FIFO. In addition to the DTR address, data may also be received, such as for DTR write transactions.

For DTC request transactions, a DTC address can be received from both ports P0 and P1. Registers 56, 57 store the P0 and P1 DTC addresses, while muxes 66, 67 allow a DTC address to be bypassed and immediately written to the DTC address FIFO. Mux 68 selects either the P0 or P1 address for writing into the DTC address FIFO. Operation of the DTR and DTC muxing logic is similar to that described for the PMW logic.

FIFO write and mux control logic 50 generates the mux select signals to muxes 60–68. The write enable or strobe signals to the address FIFOs are also generated. Signal PMW_WR causes the PMW address FIFO to store PMW_ADR. Signal DTR_WR causes the DTR address FIFO to store DTR_ADR and possibly DTR data, while Signal DTC_WR causes the DTC address FIFO to store DTC_ADR.

Logic 50 receives transaction cycle signals from the PCI interfaces that indicate when the various types of transactions are being sent across the bridge. For example, signal PMW_P0 is activated when a PMW cycle is sending address and data from port P0 to port P2. Likewise, signal PMW_P1 is activated when a PMW cycle is sending address and data from port P1 to port P2. Signals DTC_P0 or DTC_P1 are activated when a DTC cycle is sending an address and data from port P0 or P1, respectively, to port P2, while signals DTR_P0 and DTR_P1 are activated when DTR cycles are being sent from ports P0 or P1 respectively to port P2.

Logic 50 includes arbitration logic to decide which port's address to write first and which to delay (if necessary) when simultaneous cycles occur. State machines can be used to properly sequence the latching and bypassing of addresses and generate the mux select and FIFO write signals with the desired timing.

FIG. 4 is a table of transaction ordering when simultaneous addresses from different ports are received. Table 4 can be implemented in logic 50 of FIG. 3. For example, when a PMW address is received from both ports P0 and P1, the box at the intersection of the PMW column and row shows that the PMW address from port P1 is delayed, while the PMW address from port P0 is bypassed and written first to the PMW address FIFO. Note that the data from both ports P0 and P1 can be received at the same time, since separate data FIFOs are provided.

The top row of the table shows that when a PMW cycle on port P0 arrives at the same time as a DTR or DTC cycle on port P1, the DTR or DTC cycle on port P1 is delayed. Thus posted writes have priority over delayed cycles. However, when port P1 has a DTC write cycle, no delay is needed because a DTC write transaction may pass a PMW transaction. No delays are needed when one cycle is a DTR cycle, while the other is a DTC cycle, since there is no ordering requirement between DTR and DTC, and two different FIFOs can be written at the same time. When simultaneous DTR cycles occur from both ports P0 and P1, port P1 is delayed while port P0 is bypassed, Thus port P0 is ordered ahead of port P1.

Likewise, when simultaneous DTC cycles occur on the two originating ports, the cycle from port P1 is delayed. This is an arbitrary assignment and could be reversed in some embodiments.

Concurrent PMW, PMW Cycles—FIG. 5

Figure 5A:
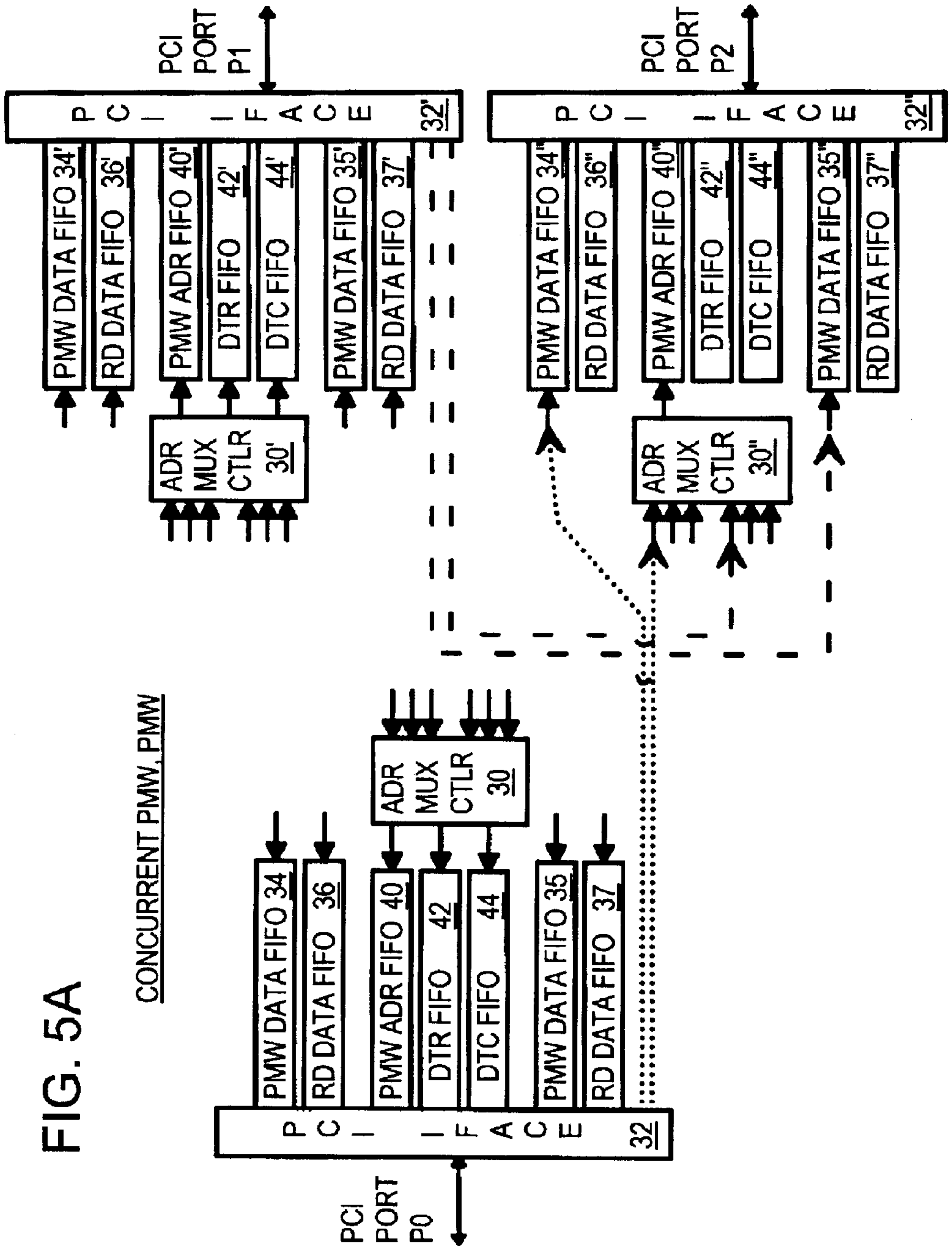
FIG. 5A shows address and data flow through the bridge when concurrent posted-memory write (PMW) transactions occur.

FIG. 5A shows address and data flow through the bridge when concurrent posted-memory write (PMW) transactions occur. One PMW transaction originates with the PCI bus on port P0, while another PMW transaction originates with port P1. Both transactions are sent to the PCI bus on port P2.

The PMW transaction from port P0 sends a PMW address from PCI interface 32 for originating port P0 through address mux 30" to PMW address FIFO 40" on destination port P2. The PMW data words from PCI interface 32 for originating port P0 are sent to PMW data FIFO 34" on destination port P2. This is shown by the dotted lines in FIG. 5A.

The other concurrent PMW transaction sends its PMW address from PCI interface 32' for originating port P1 through address mux 30" to PMW address FIFO 40" on destination port P2. Address mux 30" latches this PMW address and writes it to PMW address FIFO 40" one FIFO-clock cycle later, since the P0 address is written to PMW address FIFO 40" first. The PMW data words from PCI interface 32' for originating port P1 are sent to PMW data FIFO 35" on destination port P2. This is shown by the dashed lines in FIG. 5A.

Figure 5B:
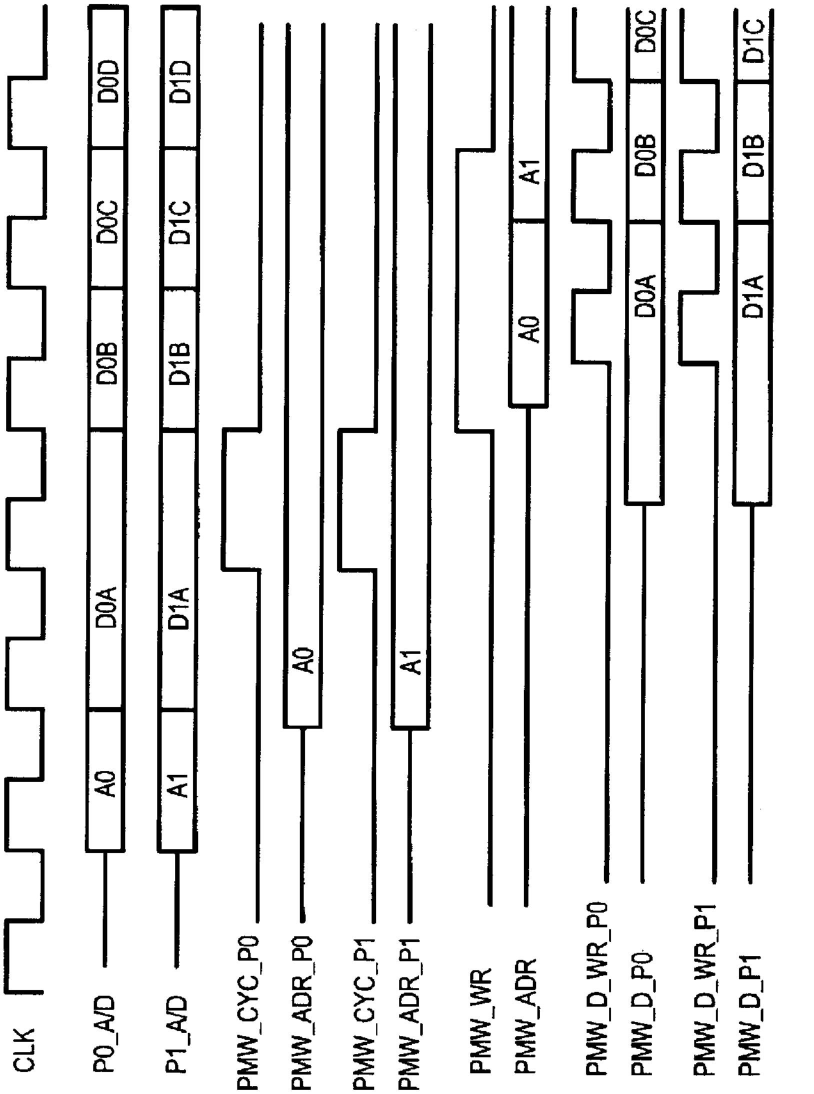
FIG. 5B is a waveform showing bridge operation for concurrent PMW cycles.

FIG. 5B is a waveform showing bridge operation for concurrent PMW cycles. A PCI bus clock is shown. For port P0, the PMW address A0 is sent over the shared address/data lines of the PCI bus, followed by a burst of data words D0A, D0B, D0C, D0D. A longer or shorter burst of data could be substituted. At the same time, on the shared address/data lines for port P1, the PMW address A1 is followed by data words D1A, D1B, D1C, D1D from port P1.

The port P0 address A0 is applied to the address mux on bus PMW_ADR_P0, while the port P1 address A1 is applied to the address mux on bus PMW_ADR_P1. Both cycle indicator signals PMW_CYC_P0 and PMW_CYC_P1 are activated and input to logic 50 of FIG. 3, indicating concurrent PMW transactions. The indicator signals are activated two cycles after the addresses are received.

The address mux control logic generates the PMW FIFO write signal, PMW_WR, for two clock cycles. During the first clock cycle, the P0 address A0 is bypassed to PMW_ADR and written into the PMW address FIFO. The port P1 address is latched. During the next clock cycle, the P1 address A1 is output by the address mux as PMW_ADR and written to the PMW address FIFO. Thus the P0 transaction is ordered ahead of the P1 transaction in the PMW address FIFO.

The data words from the shared address/data buses are delayed by the PCI interface for about 2 clock cycles due to the internal pipeline. The data words are sent from the PCI interface of the originating ports to the PMW data FIFOs of the destination port, and are written into the separate PMW data FIFOs. Data words D0A, D0B, D0C, D0D from port P0 are written into the P0-PMW data FIFO 34" (FIG. 5A) by signal PMW_D_WR_P0, while data words D1A, D1B, D1C, D1D from port P1 are written into the P1-PMW data FIFO 35" by signal PMW_D_WR_P1.

Although the P1 address is delayed, the P1 data is not delayed. Since only one transaction can take the destination bus at a time and another transaction has to wait at the destination's FIFO, the delay of the address does not affect the overall transaction latency through the bridge.

Concurrent PMW, DTR Cycles—FIG. 6

Figure 6A:
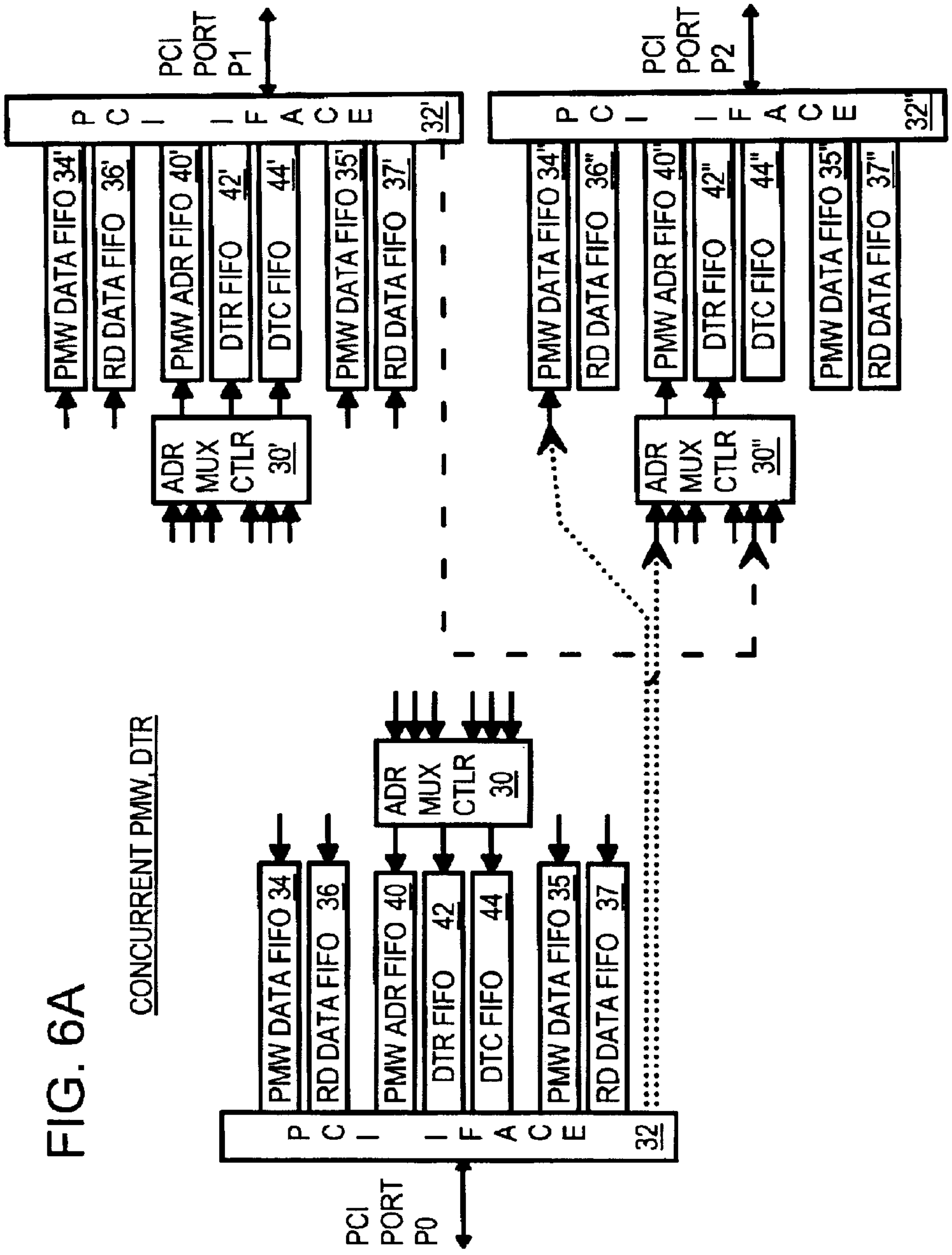
FIG. 6A shows address and data flow through the bridge when concurrent posted-memory write (PMW) and a delayed transaction request (DTR) occur.

FIG. 6A shows address and data flow through the bridge when concurrent posted-memory write (PMW) and delayed request (DTR) transactions occur. The PMW transaction originates with the PCI bus on port P0, while the DTR transaction originates with port P1. Both transactions are sent to the PCI bus on port P2.

The PMW transaction from port P0 sends a PMW address from PCI interface 32 for originating port P0 through address mux 30" to PMW address FIFO 40" on destination port P2. The PMW data words from PCI interface 32 for originating port P0 are sent to PMW data FIFO 34" on destination port P2. This is shown by the dotted lines in FIG. 6A.

The concurrent DTR transaction sends its DTR address (and data for a write) from PCI interface 32' for originating port P1 through address mux 30" to DTR address FIFO 42" on destination port P2. This is shown by the dashed lines in FIG. 6A. Address mux 30" writes the PMW address from port P0 to PMW address FIFO 40" while the DTR address from port P1 is written to DTR FIFO 42".

Figure 6B:
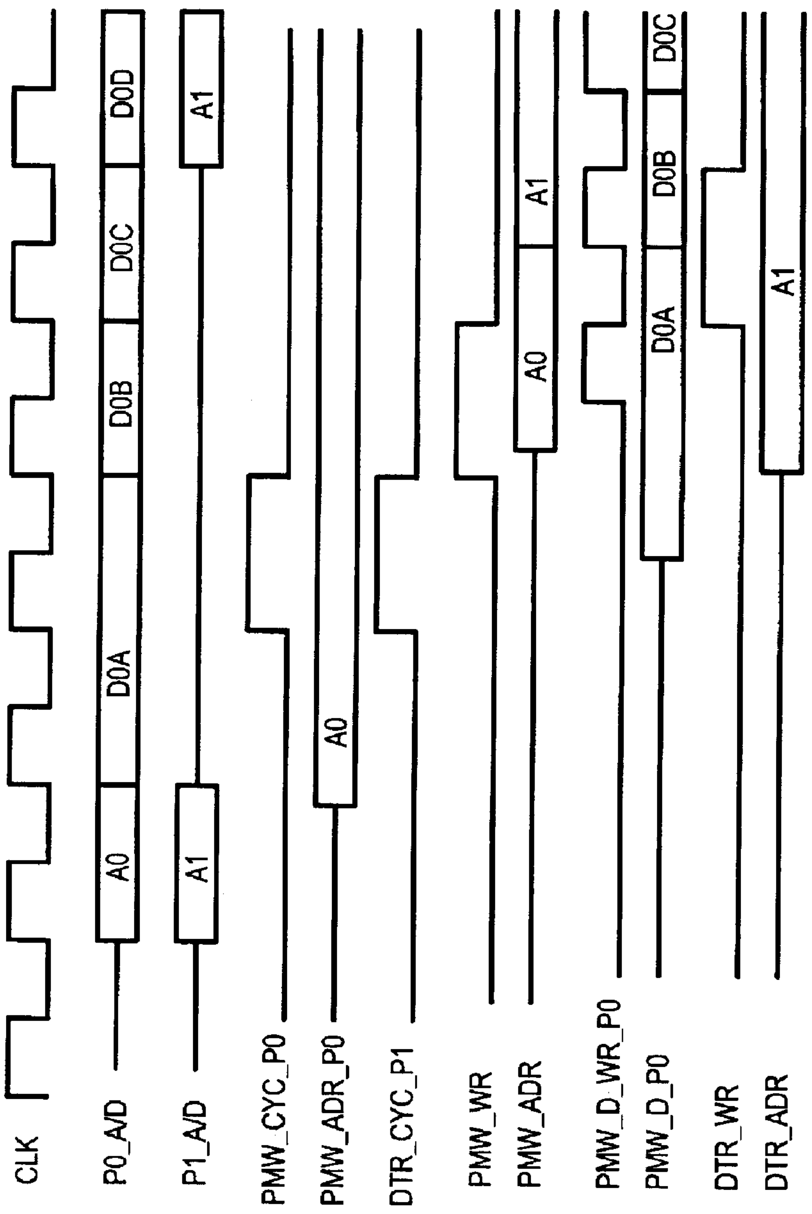
FIG. 6B is a waveform showing bridge operation for concurrent PMW and DTR read cycles.

FIG. 6B is a waveform showing bridge operation for concurrent PMW and DTR read cycles. For port P0, the PMW address A0 is sent over the shared address/data lines of the PCI bus, followed by a burst of data words D0A, D0B, D0C, D0D. A longer or shorter burst of data could be substituted. At the same time, on the shared address/data lines for port P1, the DTR address A1 is sent without any data words since this is a DTR read request.

The port P0 address A0 is applied to the address mux on bus PMW_ADR_P0, while the port P1 address A1 is applied to the address mux on bus DTR_ADR_P1 (not shown). Both cycle indicator signals PMW_CYC_P0 and DTR_CYC_P1 are activated and input to logic 50 of FIG. 3, indicating concurrent PMW, DTR transactions. The indicator signals are activated two cycles after the addresses are received.

The address mux control logic generates the PMW FIFO write signal, PMW_WR, for just one clock cycle. The P0 address A0 is bypassed to PMW_ADR and written into the PMW address FIFO. The port P1 address is latched. During the next clock cycle the latched address is output by the address mux as DTR_ADR and written to the DTR address FIFO by DTR_WR. Thus the PMW transaction is ordered ahead of the DTR transaction in the address FIFOs.

Data words D0A, D0B, D0C, D0D from port P0 are written into the P0-PMW data FIFO 34" (FIG. 6A) by signal PMW_D_WR_P0.

Concurrent PMW, DTC Cycles—FIG. 7

Figure 7A:
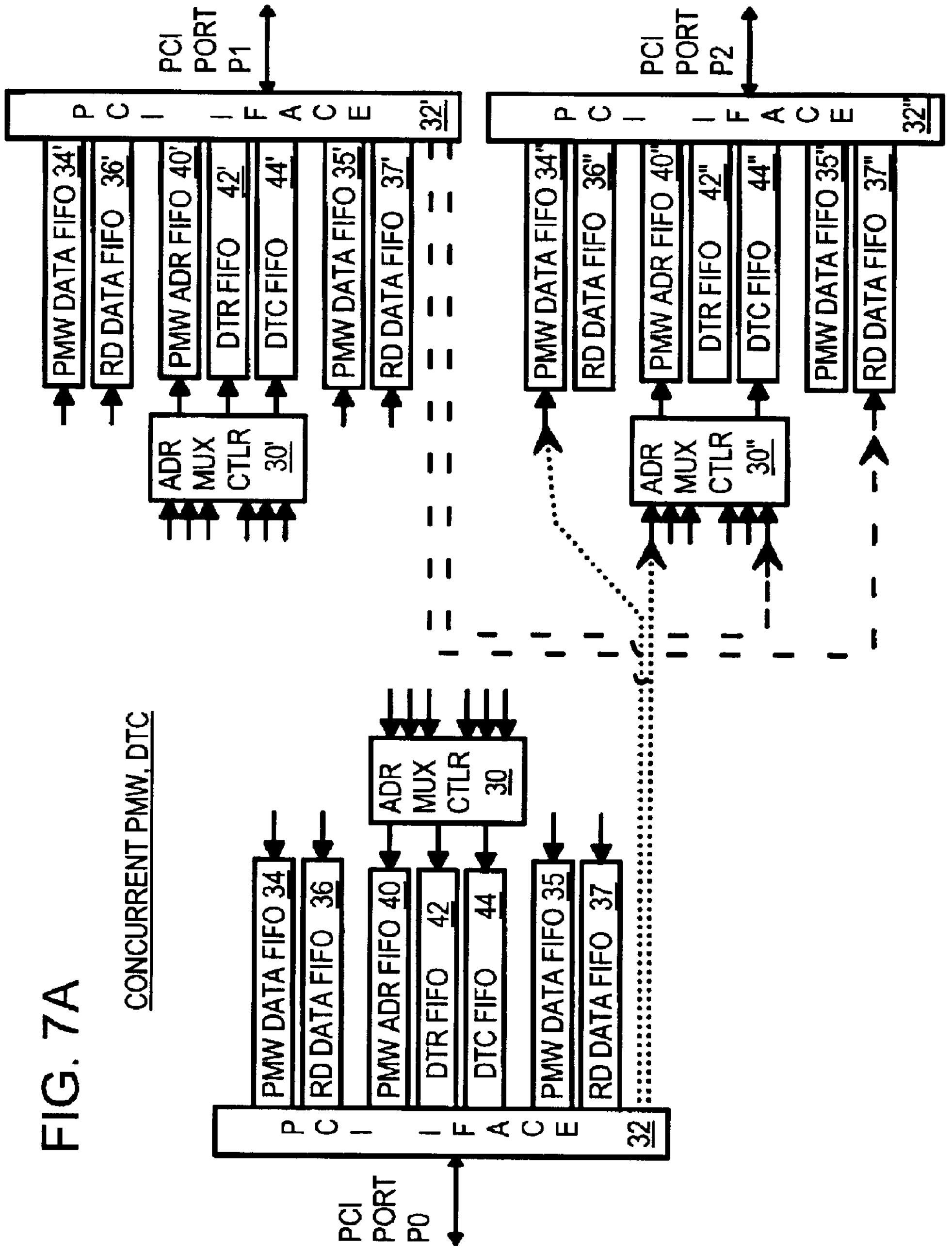
FIG. 7A shows address and data flow through the bridge when concurrent posted-memory write (PMW) and a delayed transaction completion (DTC) occur.

FIG. 7A shows address and data flow through the bridge when concurrent posted-memory write (PMW) and delayed completion (DTC) transactions occur. The PMW transaction originates with the PCI bus on port P0, while the DTC transaction originates with port P1. Both transactions are sent to the PCI bus on port P2.

The PMW transaction from port P0 sends a PMW address from PCI interface 32 for originating port P0 through address mux 30" to PMW address FIFO 40" on destination port P2. The PMW data words from PCI interface 32 for originating port P0 are sent to PMW data FIFO 34" on destination port P2. This is shown by the dotted lines in FIG. 7A.

The concurrent DTC transaction sends its DTC address from PCI interface 32' for originating port P1 through address mux 30" to DTC address FIFO 44" on destination port P2. Address mux 30" latches this DTC address and writes it to DTC address FIFO 44". The DTC data words from PCI interface 32' for originating port P1 are sent to DTC data FIFO 37" on destination port P2. This is shown by the dashed lines in FIG. 7A.

Figure 7B:
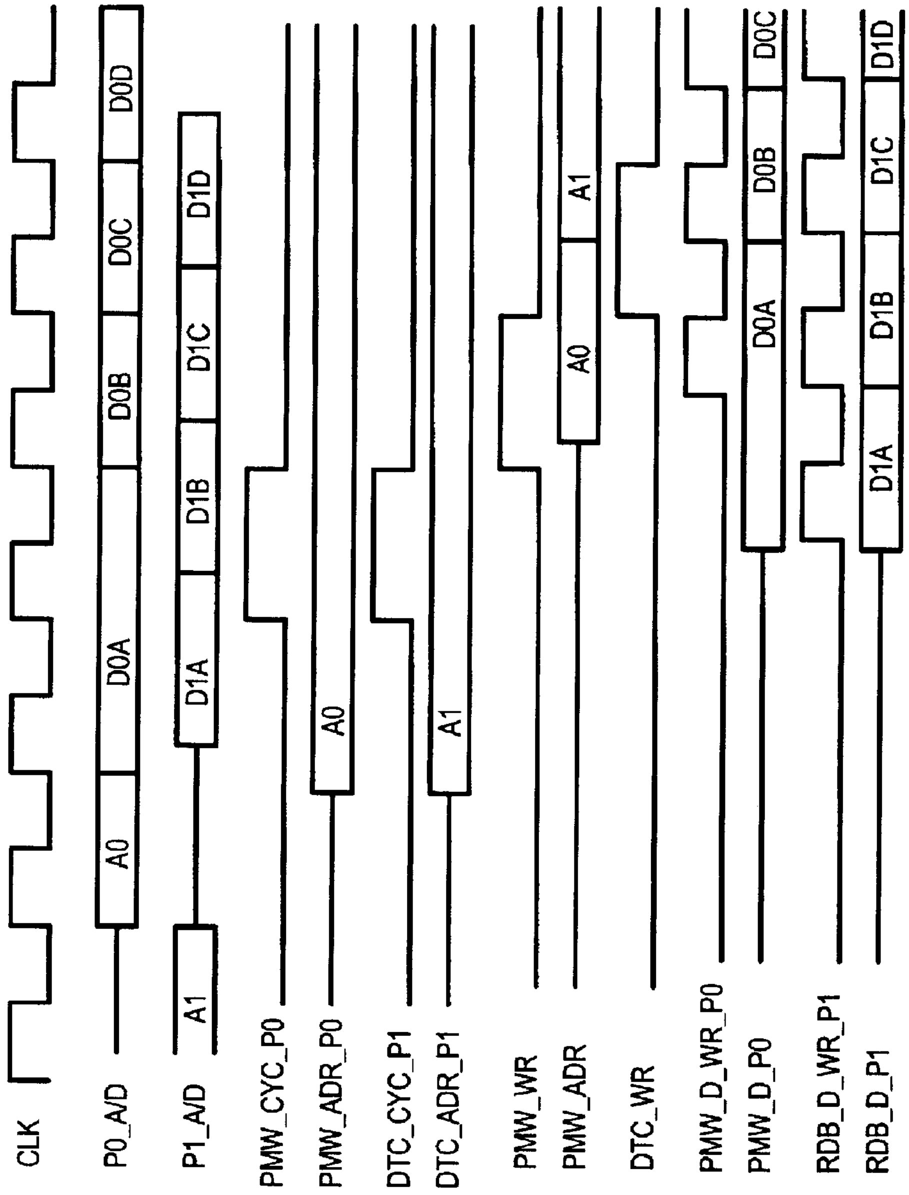
FIG. 7B is a waveform showing bridge operation for concurrent PMW and DTC cycles.

FIG. 7B is a waveform showing bridge operation for concurrent PMW and DTC read cycles. For port P0, the PMW address A0 is sent over the shared address/data lines of the PCI bus, followed by a burst of data words D0A, D0B, D0C, D0D. At about the same time, on the shared address/data lines for port P1, the DTC address A1 is followed by data words D1A, D1B, D1C, D1D from port P1. Note that transactions can be concurrent even when their address or data phases do not occur exactly on the same clock cycles. Concurrency can occur, depending on the bridge's internal pipeline.

The port P0 address A0 is applied to the address mux on bus PMW_ADR_P0, while the port P1 address A1 is applied to the address mux on bus DTC_ADR_P1. Both cycle indicator signals PMW_CYC_P0 and DTC_CYC_P1 are activated and input to logic 50 of FIG. 3, indicating concurrent PMW and DTC transactions. The indicator signals are activated at the same clock cycle, but at different numbers of clock periods after the addresses are received due to internal pipeline skews.

The address mux control logic generates the PMW FIFO write signal, PMW_WR, for one clock cycle. The P0 address A0 is latched. During the next clock cycle the latched address is output to PMW_ADR and written into the PMW address FIFO. The port P1 address A1 is bypassed by the address mux to DTC_ADR (not shown) and written to the DTC address FIFO by signal DTC_WR. The PMW (P0) transaction is ordered ahead of the DTC read (P1) transaction in the address FIFOs.

The data words from the shared address/data buses are delayed by the PCI interface for about 2 clock cycles due to the internal pipeline. The data words from port P0 are sent from the PCI interface of the originating ports to the PMW data FIFO of the destination port, and are written into the PMW data FIFO. Data words D0A, D0B, D0C, D0D from port P0 are written into the P0-PMW data FIFO 34" (FIG. 7A) by signal PMW_D_WR_P0, while data words D1A, D1B, D1C, D1D from port P1 are written into the P1-DTC data FIFO 37" by signal RDB_D_WR_P1.

Although the P1 address is delayed, the P1 data is not delayed. Since only one transaction can take the destination bus at a time and another transaction has to wait at the destination's FIFO, the delay of the P1 address does not affect the overall transaction latency through the bridge.

Concurrent DTR, DTC Cycles—FIG. 8

Figure 8A:
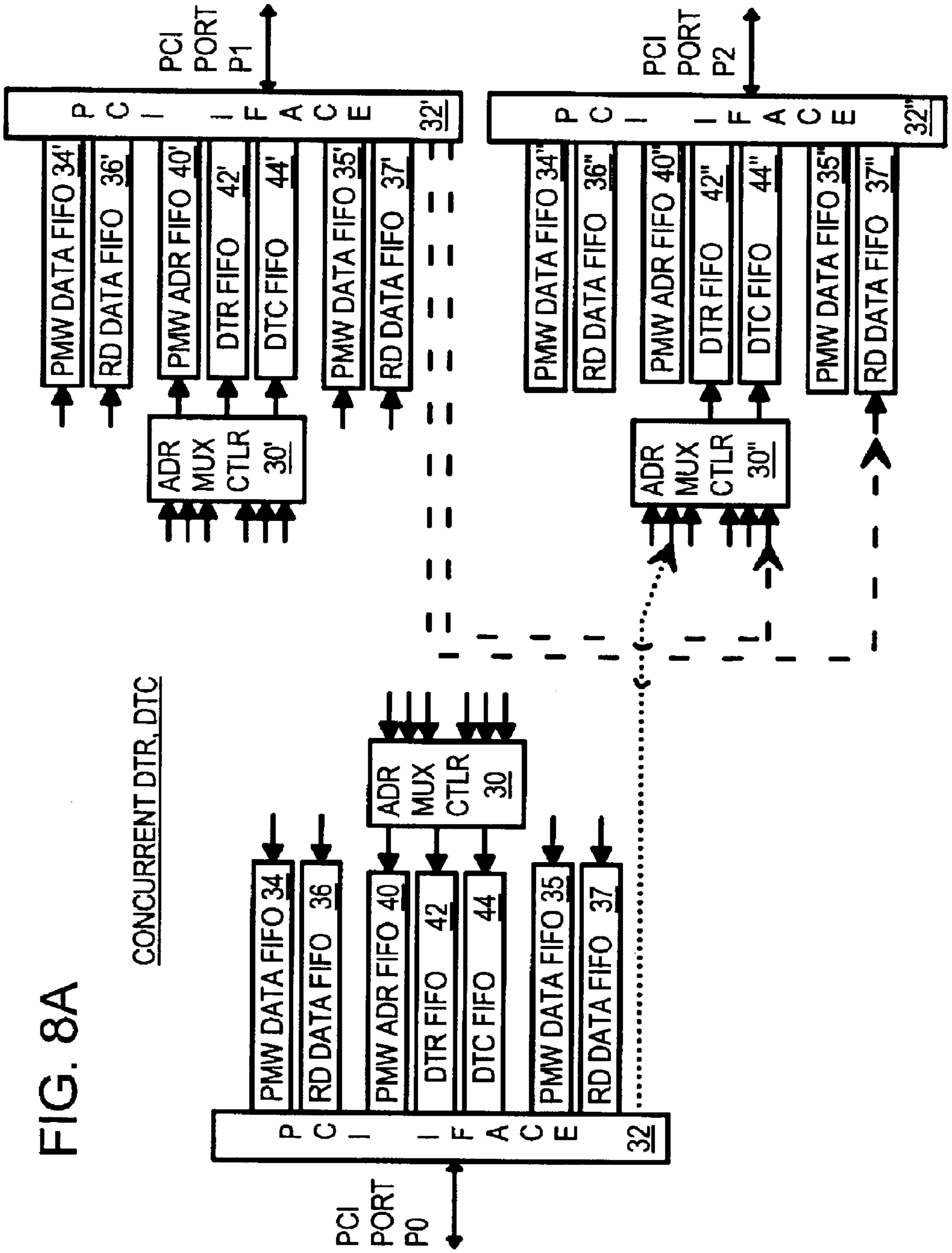
FIG. 8A shows address and data flow through the bridge when concurrent delayed transaction request (DTR) and a delayed transaction completion (DTC) occur.

FIG. 8A shows address and data flow through the bridge when concurrent delayed request (DTR) read transaction sand delayed completion (DTC) read transactions occur. The DTR transaction originates with the PCI bus on port P0, while the DTC transaction originates with port P1. Both transactions are sent to the PCI bus on the third port P2.

The DTR transaction from port P0 sends a DTR address from PCI interface 32 for originating port P0 through address mux 30" to DTR address FIFO 42" on destination port P2. Since this is a read request, no data words are transferred. The DTR address transfer is shown by the dotted line in FIG. 8A.

The concurrent DTC transaction sends its DTC address from PCI interface 32' for originating port P1 through address mux 30" to DTC address FIFO 44" on destination port P2. Address mux 30" also bypasses this DTC address and writes it to DTC address FIFO 44". The DTC data words from PCI interface 32' for originating port P1 are sent to DTC data FIFO 37" on destination port P2. This is shown by the dashed lines in FIG. 8A.

Figure 8B:
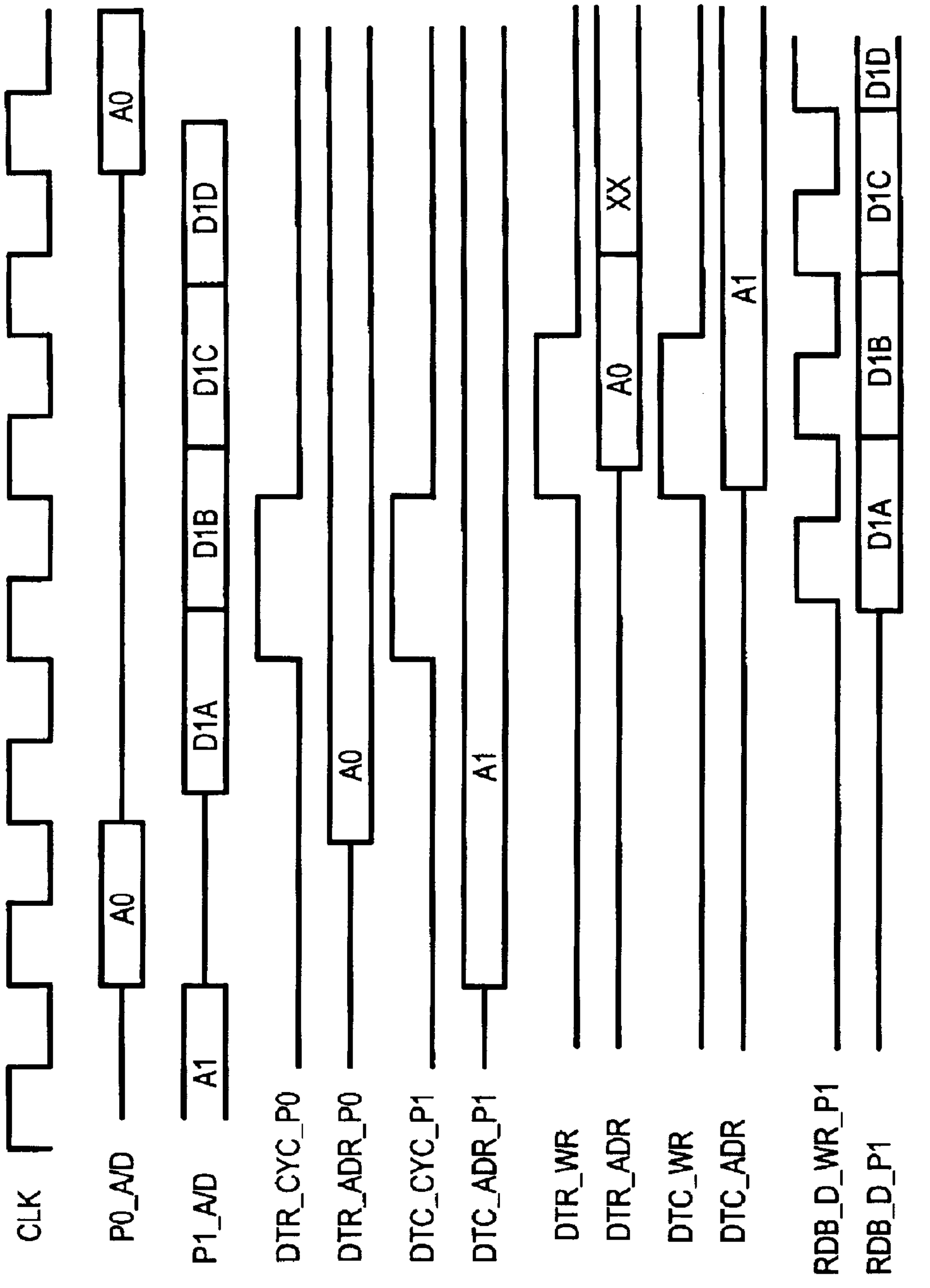
FIG. 8B is a waveform showing bridge operation for concurrent DTR read and DTC read cycles.

FIG. 8B is a waveform showing bridge operation for concurrent DTR read and DTC read cycles. For port P0, the DTR address A0 is sent over the shared address/data lines of the PCI bus. At almost the same time, on the shared address/data lines for port P1, the DTC address A1 is followed by data words D1A, D1B, D1C, D1D from port P1. Note that transactions can be concurrent even when their address phases do not occur exactly on the same clock cycles.

The port P0 address A0 is applied to the address mux on bus DTR__ADR__P0, while the port P1 address A1 is applied to the address mux on bus DTC__ADR__P1. Both cycle indicator signals DTR__CYC__P0 and DTC__CYC__P1 are activated and input to logic 50 of FIG. 3, indicating concurrent DTR and DTC transactions. The indicator signals are activated at the same clock cycle, but at different numbers of clock periods after the addresses are received due to internal pipeline skews.

The address mux control logic generates the DTR FIFO write signal, DTR__WR, for one clock cycle. The P0 address A0 is bypassed to DTR__ADR and written into the DTR address FIFO.

The port P1 address A1 is bypassed by the address mux to DTC__ADR and written to the DTC address FIFO by signal DTC__WR. The DTR and DTC addresses can be written into their own address FIFOs simultaneously, because there is no order requirement between DTR and DTC transactions and they are stored in separate address FIFOs.

The data words from the shared address/data buses are delayed by the PCI interface for about 1 clock cycle due to the internal pipeline. The data words from port P1 are sent from the PCI interface of the originating ports to the DTC data FIFO of the destination port, and are written into the DTC data FIFO on bus RDB__D__P1. Data D1A, D1B, D1C, D1D from port P1 are written into the P1-DTC data FIFO 37" by signal RDB__D__WR__P1.

Note that in this example the data words begin to be latched into the DTC data FIFO before the address is latched into the DTC address FIFO. However, since the DTC data won't be read out until the same transaction retry on the originating bus, there is no critical effect on the latency of transaction through the bridge.

Figure 9:
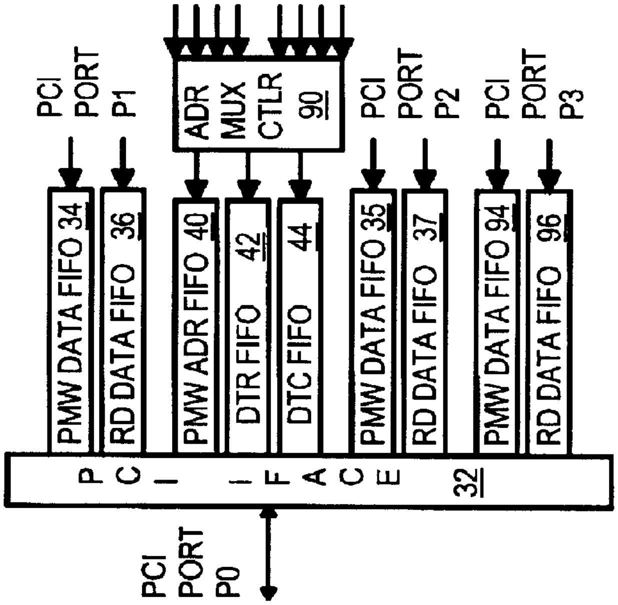
FIG. 9 is a diagram of a section of a four-port PCI bridge.

Four-port Bridge Section—FIG. 9

FIG. 9 is a diagram of a section of a four-port PCI bridge. The section shown is for just one of the four ports; the actual 4-port bridge has four such sections, one for each PCI port. The section shown is for port P0, which receives address and data from other ports P1, P2, P3.

PCI interface 32 is coupled to the shared address/data bus and control signals for a PCI bus at port P0. A pair of data FIFOs is provided to receive read and write data words from each of the other three ports P1, P2, P3. Posted-memory-write PMW data FIFO 34 receives write data from port P1, while DTC data FIFO 36 receives DTC data words from port P1 to port P0. Likewise, PMW data FIFO 35 and DTC data FIFO 37 receive PMW and DTC data words from port P2 to port P0, and PMW data FIFO 94 and DTC data FIFO 96 receive PMW and DTC data words from port P3 to port P0.

Address mux 90 receives cycle-type indicator signals and addresses from the other three ports P1, P2, P3. Address mux 90 delays one or two address when two or three addresses of transactions are concurrently sent to address mux 90. The delayed addresses are written to the address FIFO on succeeding cycles when contention occurs.

Three address FIFOs are loaded by address mux 90: PMW address FIFO 40 receives PMW addresses, DTR address FIFO 42 receives DTR addresses and data, and DTC address FIFO 44 receives DTC addresses. The size or depth of the address FIFOs can be increased when additional ports are included in the bridge to accommodate more contention sources.

Larger multi-port bridges could be constructed by adding more pairs of data FIFOs and inputs to the address mux. One additional data FIFO pair is added for each additional bridge port.

FIFO Structures

The PMW data FIFO contains several rows, or entries, such as 32. Each entry is a 38-bit word that contains a 32-bit data word, a parity bit, four bits of byte enables, and a burst bit. The burst bit is set to 1 to indicate that the entry is the last word or data-phase in a burst, but is set to zero for the earlier words in the burst.

The DTC data FIFO also has 32 rows or entries, each with 34 bits. The byte enables are not stored in the DTC data FIFO because they are stored in DTC address FIFO. The 32-bit data word has a parity bit and a burst bit. A non-burst read has the initial burst bit set to 1.

The PMW address FIFO has 16 entries of 37 bits each entry. A 32-bit address has an address parity bit. A 4-bit command code is included. A source bit is also included to indicate whether the address came from port P0 or port P1 (when the address FIFO is for port P2). When more ports are included in the bridge, the number of source bits can be increased. The source bit indicates to the PCI interface which data FIFO to read the data words from.

The DTR address FIFO has 8 entries of 80 bits each. A 32-bit address has an address parity bit and a 4-bit command code. The request can also include a 32-bit data word, a data parity bit, and four data byte enables. A source bit indicates which of the 2 source ports the transaction is from.

An activated bit can be used for re-ordering transactions. The activated bit is written in as zero, but set to one when the ordering rules have been met and the entry's DTR transaction can be output from the destination port. A 4-bit write pointer is included to store the write pointer for the PMW address FIFO. The write pointers can be compared to the PMW read pointer and the activated bit set when the pointers match, to ensure that DTR transactions won't pass all posted writes that were written ahead of the DTR transaction.

The DTC address FIFO has 8 entries of 47 bits each. A 32-bit address and a 4-bit command code are included. Four byte-enables are included for comparing with the Byte Enables of the retried delayed transaction. A source bit indicates which port the data is from. The source bit is used to select which DTC data FIFO has the data for the address entry. An activated bit and a PMW write pointer ensure that the DTC transaction won't pass all posted writes written ahead of the DTC transaction. This is required by the PCI ordering rules.

Of course, the FIFOs can have other depths or numbers or entries than described herein, and the widths of the words can also be changed, such as for 64-bit PCI bridges. Additional bits can be added for extended features.

Alternate Embodiments

Several other embodiments are contemplated by the inventors. For example the address mux logic can be implemented in a variety of ways, such as programmable logic, logic gates, state machines or controllers. A burst of four data words has been shown for simplicity, but other burst sizes such as 8, 16, or more data words can be used. The width of the data word can also change with the PCI specification or design. FIFOs can be random-access memory (RAM) and pointer-based, or can use shift registers. The pair of data FIFOs for read and write from one source port could be combined into a single FIFO for that source port.

The actual internal bus structure inside the bridge can have shared or separate internal buses for address and data. Separate buses allow for address and data to be simultaneously sent. Also, separate data buses can be used for read and write data, and separate address buses can be used for each type of transaction—PMW, DTR, DTC. Alternatively, internal bus muxing can be used to reduce routing complexity. The address muxes could use just one register for each source address, and latch all source addresses on every clock cycle. The latched addresses could then be written to any of the three address FIFOs on the next cycle, depending on the cycle type.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word 'means' is recited in a claim element, Applicant intends for the claim element to fall under 35 USC §112, paragraph 6. Often a label of one or more words precedes the word 'means'. The word or words preceding the word 'means' is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A multi-port bus bridge comprising:

a plurality of at least three port-sections coupled together, each port-section comprising:

a bus interface for coupling to an external bus, wherein each port-section has a bus interface for coupling to a different external bus;

a first data first-in-first-out (FIFO) for storing data words from a port-section acting as a first source port, the first data FIFO outputting the data words to the bus interface for transmission of the data words to the external bus;

a second data first-in-first-out (FIFO) for storing data words from another port-section acting as a second source port, the second data FIFO outputting the data words to the bus interface for transmission of the data words to the external bus;

a posted-write address FIFO, coupled to receive addresses from both the first and second source ports for posted-write bus transactions, the posted-write address FIFO outputting an address to the bus interface that is transmitted during a posted-write bus transaction to the external bus with data words from the first data FIFO when the address was received from the first source port, and data words from the second data FIFO when the address was received from the second source port;

a request address FIFO, coupled to receive addresses from both the first and second source ports for request bus transactions, the request address FIFO outputting an address to the bus interface that is transmitted during a request bus transaction to the external bus;

a completion address FIFO, coupled to receive addresses from both the first and second source ports for completion bus transactions, the completion address FIFO outputting an address to the bus interface that is transmitted during a completion bus transaction to the external bus; and an address multiplexer, coupled to the posted-write address FIFO, the request address FIFO, and to the completion address FIFO, for delaying the address from the second source port when addresses of a same type from both the first and second source ports are received concurrently, the address multiplexer for merging addresses from the first and second source ports into the posted-write address FIFO, the request address FIFO, and to the completion address FIFO, whereby the posted-write address FIFO, the request address FIFO, and to the completion address FIFO each store addresses from both the first and second source ports, but the first data FIFO stores data words from only the first source port while the second data FIFO stores data words from only the second source port.

2. The multi-port bus bridge of claim 1 wherein the first data FIFO comprises a pair of data FIFOs that include a posted-write data FIFO for storing data words for a posted-write bus transaction, and a delayed-transaction-completion data FIFO for storing data words for a delayed completion bus transaction, whereby pairs of data FIFOs are provided for each source port at each destination port-section.

3. The multi-port bus bridge of claim 2 wherein the external bus is a Peripheral Component Interconnect (PCI) bus having shared address and data lines.

4. The multi-port bus bridge of claim 3 wherein the request bus transaction is a delayed transaction request (DTR) cycle while the completion bus transaction is a delayed transaction completion (DTC) cycle, the DTC cycle being in response to the DTR cycle.

5. The multi-port bus bridge of claim 2 wherein the posted-write address FIFO, the request address FIFO, and to the completion address FIFO comprise address entries that include a source bit, the source bit indicating whether the address was received from the first source port or the second source port;

wherein the bus interface selects data words from either the first or second data FIFO based on the source bit.

6. The multi-port bus bridge of claim 5 wherein the request address FIFO and the completion address FIFO contain address entries that include a FIFO write pointer for the posted-write address FIFO, the FIFO write pointer in an entry being a copy of the FIFO write pointer of the posted-write address FIFO when the address was written to the request address FIFO or the completion address FIFO, whereby copies of the FIFO write pointer for the posted-write address FIFO are stored with address entries.

7. The multi-port bus bridge of claim 6 wherein an address entry in the request address FIFO or the completion address FIFO is prevented from being sent to the bus interface until a read pointer for the posted-write FIFO matches the FIFO write pointer stored with the address entry, whereby posted write bus transactions are ordered ahead of request and completion bus transactions.

8. The multi-port bus bridge of claim 7 wherein the address mux comprises a delay mux that comprises:

a first address latch for storing the address from the first source port;

a second address latch for storing the address from the second source port;

a first bypass mux for selecting either the address from the first source port or a latched first address from the first address latch;

a second bypass mux for selecting either the address from the second source port or a latched second address from the second address latch;

a final mux, coupled to select an address to write to an address FIFO from an output from either the first or second bypass mux.

9. The multi-port bus bridge of claim 8 wherein the address mux comprises at least three delay muxes, one for each address FIFO.

10. The multi-port bus bridge of claim 1 wherein each port-section further comprises:

a third data first-in-first-out (FIFO) for storing data words from another port-section acting as a third source port, the third data FIFO outputting the data words to the bus interface for transmission of the data words to the external bus, wherein the multi-port bus bridge comprises a plurality of at least four port-sections coupled together.

11. A three-port bus bridge for concurrent bus transactions comprising:

a first port comprising:

a first bus interface for coupling to a first external bus;

a first-second data buffer for storing data from a second port for transmission to the first external bus;

a first-third data buffer for storing data from a third port for transmission to the first external bus;

a first address buffer for storing addresses from the second port and from the third port for transmission to the first external bus;

a first address mux, coupled to write addresses to the first address buffer, for delaying writing of an address to the first address buffer when addresses are concurrently received from the second and third ports;

the second port comprising:

a second bus interface for coupling to a second external bus;

a second-third data buffer for storing data from the third port for transmission to the second external bus;

a second-first data buffer for storing data from the first port for transmission to the second external bus;

a second address buffer for storing addresses from the third port and from the first port for transmission to the second external bus;

a second address mux, coupled to write addresses to the second address buffer, for delaying writing of an address to the second address buffer when addresses are concurrently received from the third and first ports;

the third port comprising:

a third bus interface for coupling to a third external bus;

a third-first data buffer for storing data from the first port for transmission to the third external bus;

a third-second data buffer for storing data from the second port for transmission to the third external bus;

a third address buffer for storing addresses from the first port and from the second port for transmission to the third external bus; and a third address mux, coupled to write addresses to the third address buffer, for delaying writing of an address to the third address buffer when addresses are concurrently received from the first and second ports, whereby contention for the data buffers is avoided since separate data buffers are provided for each source port.

12. The three-port bus bridge of claim 11 wherein buffers are first-in-first-out (FIFO) memories.

13. The three-port bus bridge of claim 12 wherein the first, second, and third address buffers each comprise:

a posted-write address FIFO for storing addresses for posted-write cycles;

a delayed-transaction-request (DTR) address FIFO for storing addresses for DTR cycles; and a delayed-transaction-completion (DTC) address FIFO for storing addresses for DTC cycles, whereby separate address FIFOs are provided for three types of cycles.

14. The three-port bus bridge of claim 13 wherein the data buffers each comprise:

a write data FIFO for storing data words from a posted-write cycle that have an address stored in the posted-write address FIFO; and a DTC data FIFO for storing data words from a DTC cycle that have an address stored in the DTC address FIFO, whereby each data buffer has a pair of FIFOs.

15. The three-port bus bridge of claim 14 wherein the first, second, and third external buses are each separate Peripheral Component Interconnect (PCI) buses.

16. The three-port bus bridge of claim 14 wherein the first, second, and third external buses have shared address/data lines.

17. The three-port bus bridge of claim 14 wherein the three-port bus bridge is cascaded with other three-port bus bridges.

18. A bus bridge comprising:

a first port means for buffering address and data from a second external bus and from a third external bus that are destined for a first external bus;

a second port means for buffering address and data from the first and third external buses that are destined for a second external bus;

a third port means for buffering address and data from the second and first external buses that are destined for a third external bus;

wherein the first port means comprises:

first bus interface means for coupling to the first external bus;

first-second data buffer means for storing data from the second port means for transmission to the-first external bus;

first-third data buffer means for storing data from the third port means for transmission to the first external bus;

first address buffer means for storing addresses from the second port means and from the third port means for transmission to the first external bus;

first address mux means, coupled to write addresses to the first address buffer means, for delaying writing of an address to the first address buffer means when addresses are concurrently received from the second and third ports means;

wherein the second port means comprises:

second bus interface means for coupling to the second external bus;

second-first data buffer means for storing data from the first port means for transmission to the second external bus;

second-third data buffer means for storing data from the third port means for transmission to the second external bus;

second address buffer means for storing addresses from the first port means and from the third port means for transmission to the second external bus;

second address mux means, coupled to write addresses to the second address buffer means, for delaying writing of an address to the second address buffer means when addresses are concurrently received from the first and third ports means;

wherein the third port means comprises:

third bus interface means for coupling to the third external bus;

third-second data buffer means for storing data from the second port means for transmission to the third external bus;

third-first data buffer means for storing data from the first port means for transmission to the third external bus;

third address buffer means for storing addresses from the second port means and from the first port means for transmission to the third external bus; and third address mux means, coupled to write addresses to the third address buffer means, for delaying writing of an address to the third address buffer means when addresses are concurrently received from the second and first ports means;

whereby concurrent transactions are sent through the bus bridge.

19. The bus bridge of claim 18 wherein the first, second, and third external buses are Peripheral Component Interconnect (PCI) buses.

20. The bus bridge of claim 18 wherein the data buffers means each comprise:

write data FIFO means for storing data words from a posted-write cycle that have an address stored in the address buffer means; and DTC data FIFO means for storing data words from a delayed-transaction-completion cycle that have an address stored in the address buffer means, whereby each data buffer means has a pair of FIFOs.

* * * * *